(12) United States Patent
Dixon

(10) Patent No.: US 6,688,778 B1
(45) Date of Patent: Feb. 10, 2004

(54) CONNECTOR SYSTEM FOR FIBER OPTIC MALE CONTACTS

(75) Inventor: Trevor James Dixon, Haverhill (GB)

(73) Assignee: Interlemo Holdings S.A., St-Sulpice (CH)

( * ) Notice: Subject to any disclaimer, the term of this patent is extended or adjusted under 35 U.S.C. 154(b) by 0 days.

(21) Appl. No.: 09/807,184

(22) PCT Filed: Sep. 1, 1999

(86) PCT No.: PCT/EP99/06405
§ 371 (c)(1),
(2), (4) Date: May 31, 2001

(87) PCT Pub. No.: WO00/22469
PCT Pub. Date: Apr. 20, 2000

(30) Foreign Application Priority Data

Oct. 13, 1998 (EP) .............................. 98119250

(51) Int. Cl.[7] ................................ G02B 6/38
(52) U.S. Cl. ......................... 385/72; 385/60
(58) Field of Search ............... 385/72, 60, 55, 385/56, 66

(56) References Cited

U.S. PATENT DOCUMENTS

| 4,779,948 A | * | 10/1988 | Wais et al. ............... 385/88 |
| 4,886,335 A | | 12/1989 | Yanagawa et al. |
| 4,895,424 A | * | 1/1990 | Hughes .................. 385/56 |
| 5,195,905 A | | 3/1993 | Pesci |
| 5,217,391 A | * | 6/1993 | Fisher, Jr. .............. 439/578 |
| 5,239,606 A | | 8/1993 | Shibutani et al. |
| 5,563,971 A | | 10/1996 | Abendschein |
| 5,563,978 A | | 10/1996 | Kawahara et al. |
| 5,608,828 A | * | 3/1997 | Coutts et al. ............ 385/59 |
| 6,019,519 A | * | 2/2000 | Grinderslev et al. ...... 385/56 |

FOREIGN PATENT DOCUMENTS

| DE | 44 20 859 A | 12/1994 |
| EP | 0 323 920 A | 7/1989 |
| EP | 0 398 161 A | 11/1990 |
| EP | 0 487 054 A | 5/1992 |

OTHER PUBLICATIONS

International Search Report in SN EP 99/06405.

* cited by examiner

Primary Examiner—Hae Moon Hyeon
(74) Attorney, Agent, or Firm—Bugnion S.A.; John Moetteli

(57) ABSTRACT

The connector system comprises a standard DIN 41612 two-part connector for printed circuit boards having a plug shell 1 inserted into a socket shell 2, which shells have grids 5, 12 and opposed cavities 6, 13 for separate contacts. A front plug shell hollow insert 16 and a rear plug shell hollow insert 17 are assembled in communication to one another in a cavity 6 of the plug shell 1. A front socket shell hollow insert 31 and a rear socket shell hollow insert 32 are assembled in communication to one another in a cavity 13 of the socket shell 2 opposed to the cavity 6 of the plug shell 1. An alignment sleeve 48 is placed in a floating condition in a housing 49 formed in the front plug shell insert 16. Alignment sleeve 48 allows front to front aligned housing of the ferrules 52 of two fibre optic male contacts plugged into the rear plug shell insert 17 and rear socket shell insert 32.

13 Claims, 4 Drawing Sheets

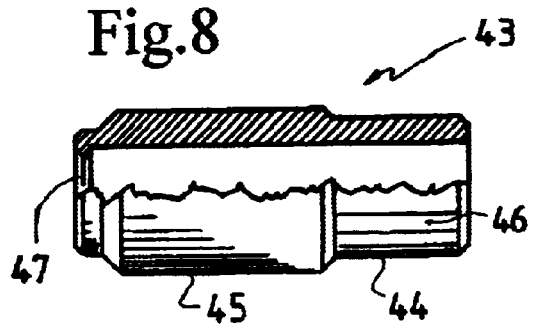
Fig.8
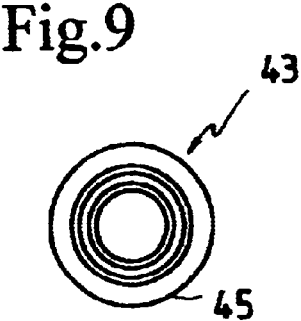
Fig.9
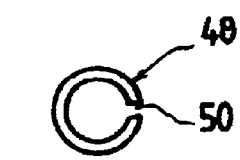
Fig.10
Fig.11
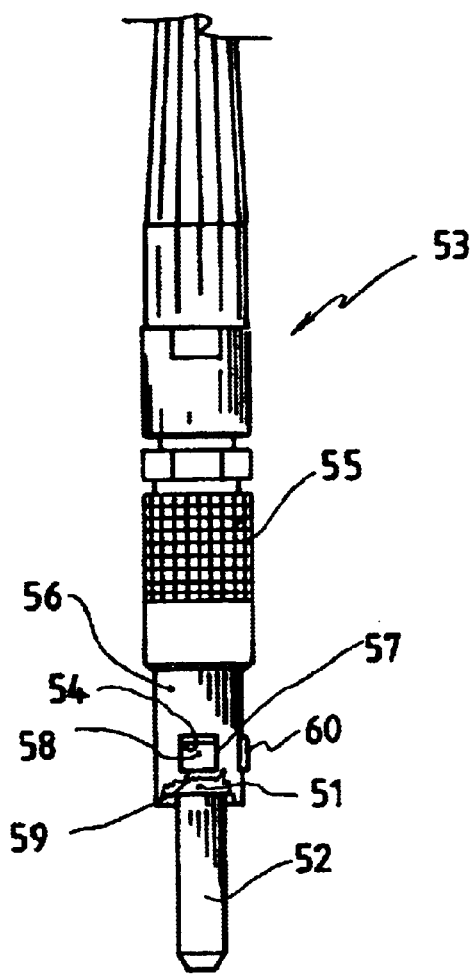
Fig.12

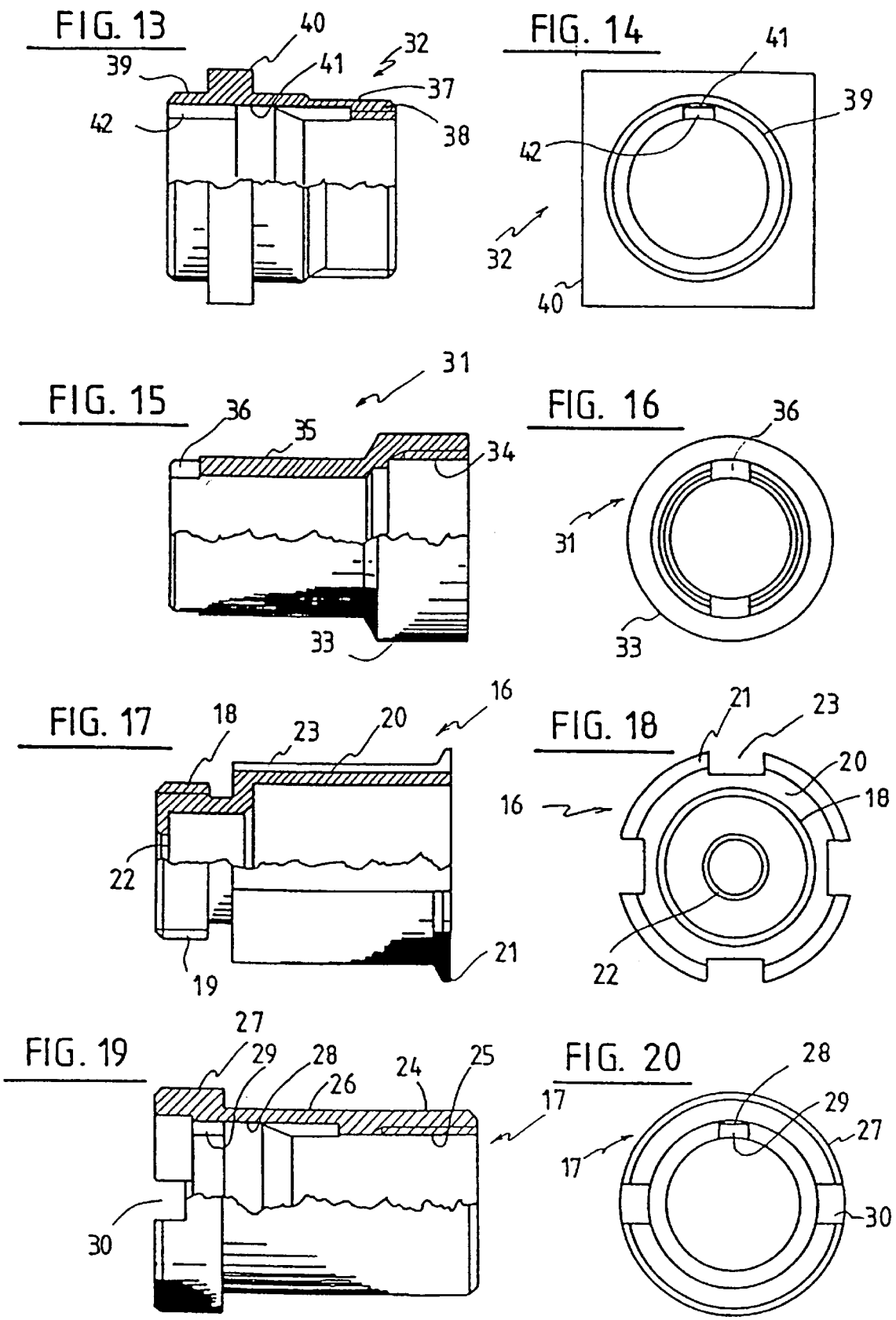

CONNECTOR SYSTEM FOR FIBER OPTIC MALE CONTACTS

BACKGROUND OF THE INVENTION

This invention relates to a connector system for fibre optic male contacts having an elongated ferrule for centrally housing an end portion of a fibre optic core.

European Patent Application No EP-A-0398161 describes such a fibre optical connector comprising a standard two-part connector for printed circuit boards having a plug shell inserted into a socket shell provided with a plurality of opposed cavities for separate contacts. The plug shell cavities are equipped with socket shell hollow inserts allowing a more accurate alignment of said ferrules.

U.S. Pat. No. 5,195,905 discloses a connecting device including two tubular bodies each of which is connected to a conductor of electrical or of similar signals. The device comprises automatic engagement locking means and manual disengagement means.

Such systems are commonly used for optically coupling optic fibres to each other. They require however a precise environment for proper front to front alignment of the ferrules of the fibre optic male contacts.

EP-A-0398161 describes such a fibre optical connector comprising a standard two-part connector for printed circuit boards having a plug shell inserted into a socket shell provided with a plurality of opposed cavities for separate contacts. The plug shell cavities are equipped with socket shell hollow inserts allowing a more accurate alignment of said ferrules.

U.S. Pat. No. 5,195,905 discloses a connecting device including two tubular bodies each of which is connected to a conductor of electrical or of similar signals. The device comprises automatic engagement locking means and manual disengagement means.

SUMMARY OF THE INVENTION

It is an object of this invention to enlarge the possibilities of use of these fibre optic male contacts by means of a connector system which is versatile, cheap and easy to supply while providing high quality fibre optic performance.

According to a first aspect of the invention, there is provided a connector system for fibre optic male contacts having an elongated ferrule for centrally housing an end portion of a fibre optic core, comprising a standard two-part connector for printed circuit boards having a plug shell inserted into a socket shell, said shells having grids and a plurality of opposed cavities for separate contacts, a front plug shell hollow insert and a rear plug shell hollow insert assembled in communication to one another in a cavity of the plug shell, and a floating alignment sleeve characterised in that it comprises a front socket shell hollow insert and a rear socket shell hollow insert assembled in communication to one another in a cavity of the socket shell opposed to said cavity of the plug shell, in that said front socket shell insert has a first portion engaged into said cavity of the socket shell and a second portion engaged into said front plug shell insert and in that said floating alignment sleeve extends at least in one of said front plug shell insert and front socket shell insert for front to front aligned housing of the ferrules of two fibre optic male contacts respectively plugged into said rear plug shell insert and rear socket shell insert.

Accordingly, a connector system is obtained which enables high performance fibre optic male contacts to be used in conjunction with standard unmodified printed circuit boards connectors. While still offering the convenience of printed circuit boards use, the system enables telecommunication quality fibre optic performance to be achieved. The fully floating ferrule alignment mechanism provides excellent mechanical, environmental and optical performance despite the relatively poor precision of the standard two-part connector. The supply and termination of the connector system are particularly advantageous and the system is suitable for a variety of applications, including industrial, military, deployable communication, instrumentation, shipboard, aerospace, broadcast, high energy physics, medical, motor-sports, telecommunications, and data-communications. The system is applicable to singlemode and multimode applications and target performance is excellent on the viewpoint of insertion loss, back reflection, temperature cycling, shock, repeatability, connector durability, humidity resistance, and vibration.

According to a further aspect of the invention, the rear plug shell insert is rotatively mounted in said cavity of the plug shell and has a first portion with an inner thread and a second portion forming a collar resting against an external shoulder formed around said cavity, and the front plug shell insert has a first portion with an outer thread meshing into the inner thread of the first portion of the rear plug shell insert and a second portion in sliding fit in said cavity, said second portion of the front plug shell insert ending in a collar resting in an external groove formed around said cavity. In a preferred arrangement, said second portion of said front plug shell insert has longitudinally extending external grooves engaged on longitudinal ridges formed in said cavity.

According to a further aspect of the invention, the front socket shell insert has its first portion rotatively mounted in said cavity of the socket shell said first portion having an inner thread and resting against an inner shoulder of said cavity, and said rear socket shell insert has its first portion in sliding fit in said cavity and with an outer thread meshing into the inner thread of the first portion of the front socket shell insert and a second portion resting against said socket shell. Preferably, said second portion of the rear socket shell insert has a polygonal collar resting between external ridges formed around said cavity. Still preferably, the front socket shell insert has its second portion engaged into said second portion of the front plug shell insert.

In a preferred arrangement, the connector system further comprises a tubular sleeve retainer having a first portion affixed in said first portion of the front plug shell insert and a second portion engaged into said second portion of the front socket shell insert, wherein the alignment sleeve is floating in said tubular sleeve retainer. The first portion of the tubular sleeve retainer may be press-fitted into said first portion of the front plug shell insert.

The rear plug shell insert and the rear socket shell insert may each have a circular transverse inner latch catching groove, while each of said fibre optic male contacts is mounted in a plug adapted to be inserted into said rear plug shell insert or rear socket shell insert, said plug having radially movable resilient latches for insertion into said latch catching grooves. In a further embodiment, inclined surfaces are formed on said latches and wall means may be arranged on said plug for urging the latches against the resiliency thereof. A control sleeve may be mounted for longitudinal movement on said plug, with said wall means being connected to said control sleeve. A longitudinal inner groove may be arranged in each of said rear plug shell insert and rear socket shell insert, with a radial stud being arranged on said control sleeve for sliding fit insertion into said grooves.

These and other objects, features and advantages of the invention will become readily apparent from the following detailed description with reference to the accompanying drawings which show, diagrammatically and by way of example only, a preferred but still illustrative embodiment of the invention.

BRIEF DESCRIPTION OF THE DRAWINGS

FIGS. 8, 9, and 10, 11, are respectively part sectional side elevations and top plan views of two details of FIG. 1.

FIG. 12 is a longitudinal view of a detail of FIG. 1.

FIGS. 13, 14–15, 16–17, 18–19, 20 are respectively part sectional side elevations and top plan views of further details of FIG. 1.

DETAILED DESCRIPTION OF THE PREFERRED EMBODIMENTS

Figure 1:
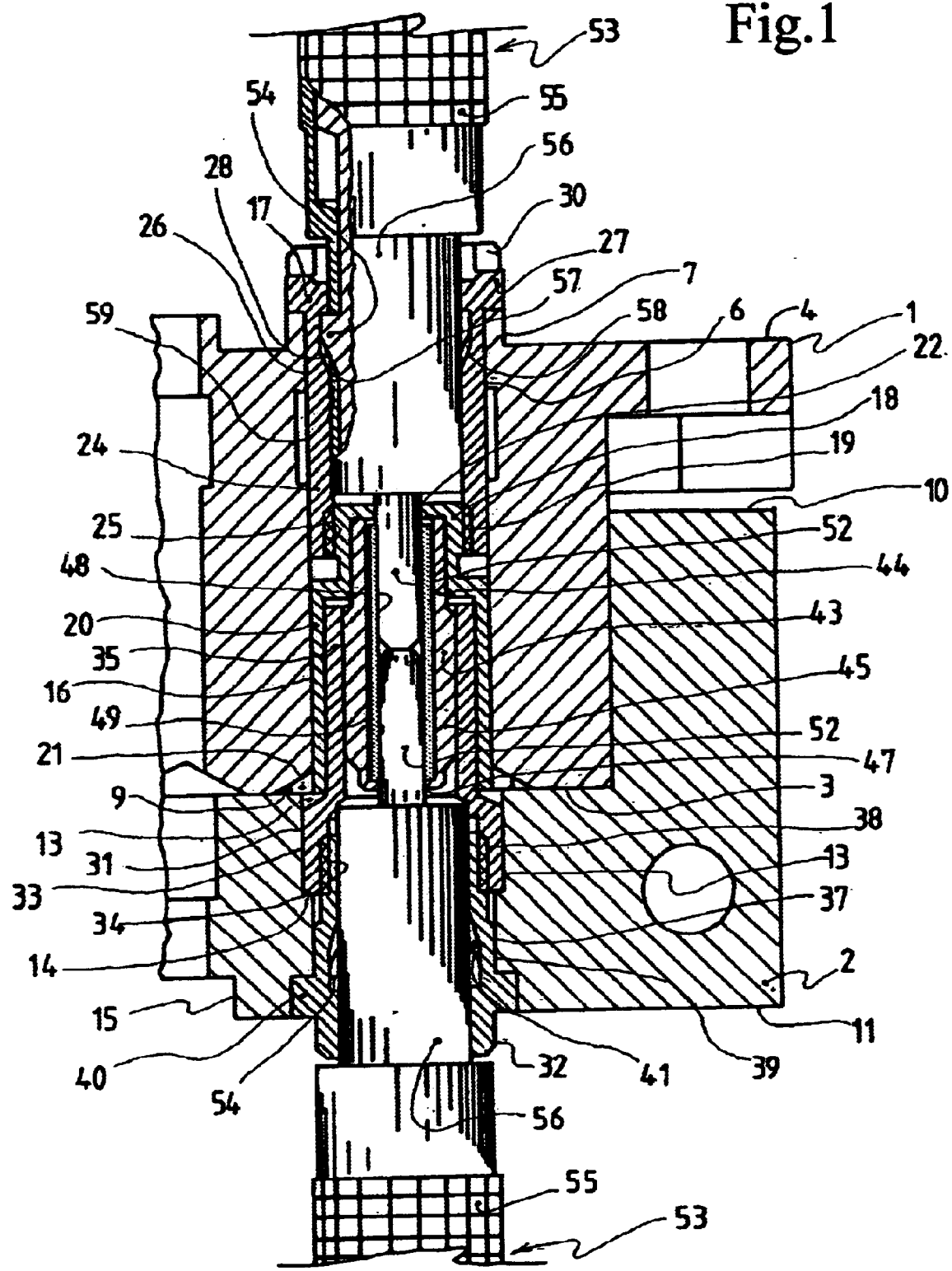
FIG. 1 is a transverse section of the preferred embodiment of the connector system of the invention.

The connector system shown in FIG. 1 comprises a standard two-part connector for printed circuit boards. In the example shown, this connector is a DIN 41612 connector. The connector comprises a plug shell 1 removably inserted into a socket shell 2.

Figure 2:
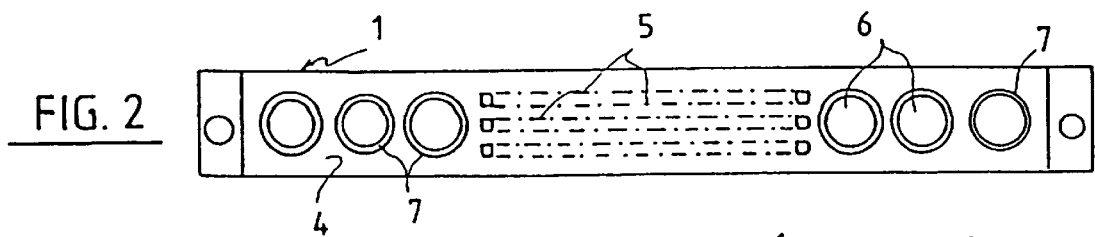
FIGS. 2, 3, and 4 are respectively a rear plan view, a side elevation, and a front plan view of the plug shell of a standard two-part connector.
Figure 3:
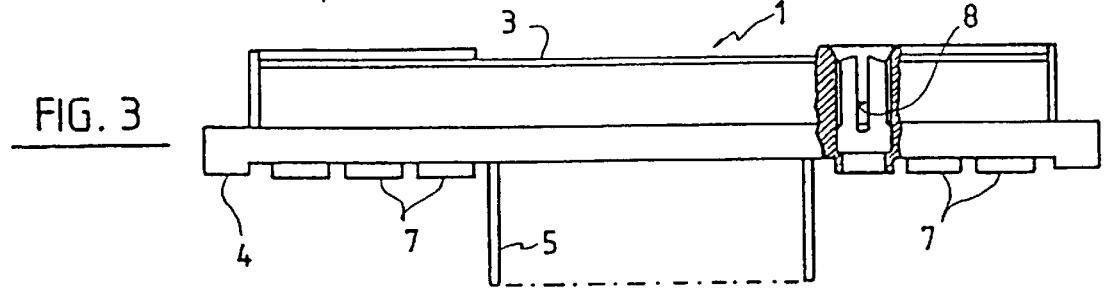
Figure 4:
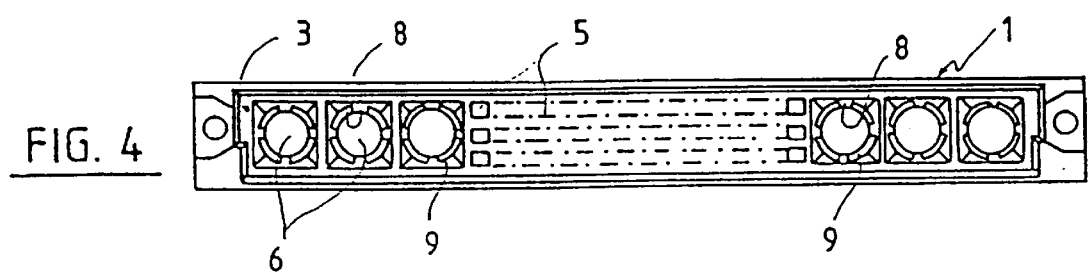

Plug shell 1 (FIGS. 2–4) has a front face 3 and a rear face 4, grids 5, and a plurality of cavities 6 for separate contacts (non shown). Each cavity 6 is surrounded on the rear face 4 by an external shoulder 7 and comprises internal longitudinal ridges 8 ending on the front face 3 in an external groove 9 formed around cavity 6.

Figure 5:
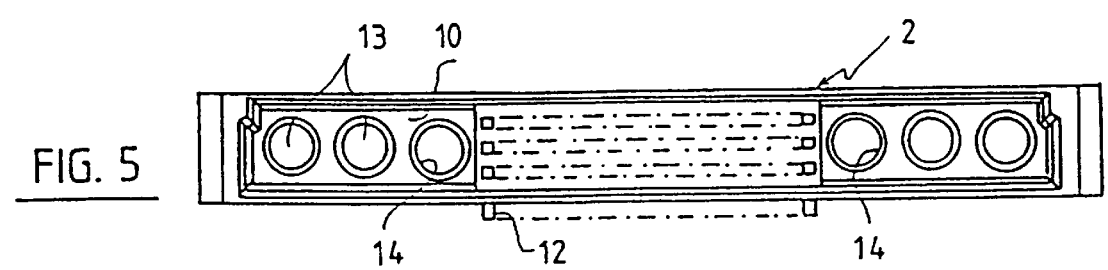
FIGS. 5, 6, and 7 are respectively a front plan view, a side elevation and a rear plan view of the socket shell of said standard two-part connector.
Figure 6:
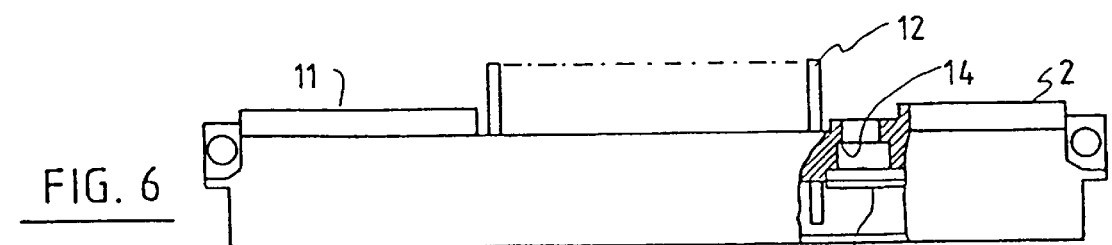
Figure 7:
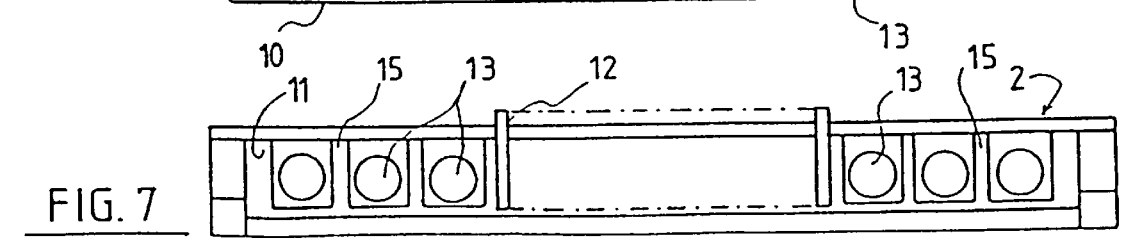

Socket shell 2 (FIGS. 5–7) has a front face 10 and a rear facel 11, grids 12, and a plurality of cavities 13 for separate contacts (not shown), respectively opposed to the cavities 6 of the plug shell 1. Each cavity 13 has an inner shoulder 14 and comprises external ridges 15 formed therearound on the rear face 11 of socket shell 2.

Those structures of the DIN 41612 connector are standard and need no further description.

A front plug shell hollow insert 16 (FIGS. 1 and 17, 18) and a rear plug shell hollow insert 17 (FIGS. 1 and 19, 20) are assembled in communication to one another in one of the cavities 6 of the plug shell 1.

Front plug shell insert 16 comprises a first portion 18 with an outer thread 19 and second portion 20 in sliding fit in cavity 6. Second portion 20 has a larger diameter than first portion 18, and first portion 18 ends in a reduced hole 22. Second portion 20 ends in acollar 21 adapted to rest against the external groove 9 of cavity 6. Preferably, second portion 20 has longitudinally extending external grooves 23 for engagement on the internal ridges 8 of cavity 6.

Rear plug shell insert 17 comprises a first portion 24 with an inner thread 25 adapted to mesh on the outer thread 19 of the first portion 18 of front plug shell insert 16, and a second portion 26 rotatively mounted in cavity 6 and ending in a collar 27 adapted to rest against the external shoulder 7 of cavity 6. Preferably, the rear plug shell insert 17 has a circular transverse inner latch catching groove 28 and a longitudinal inner groove 29 the purpose of which will be explained hereafter. Collar 27 has transverse screwdriver slots 30.

Thus assembly of front plug shell insert 16 and rear plug shell insert 17 is achieved by engaging front plug shell insert 16 into cavity 6 as from the front face 3 of plug shell 1 and by engaging rear plug shell insert 17 into cavity 6 as from the rear face 4 of plug shell 1. Meshing of the thread 25 of rear plug shell insert 17 onto thread 19 of front plug shell insert 16 via a screwdriver inserted in slots 30 allows assembly of the two plug shell inserts. Angular position of the assembly is selected and fixed by interpenetration of the internal ridges 8 of cavity 6 into longitudinally extending external grooves 23 of front plug shell insert 16. Longitudinal position of the assembly is fixed by the collar 21 of front plug shell insert 16 resting in groove 9 formed around cavity 6 and by the collar 27 of rear plug shell 17 resting against external shoulder 7 formed around cavity 6.

A front socket shell hollow insert 31 (FIGS. 1 and 15, 16) and a rear socket shell hollow insert 32 (FIGS. 1 and 13, 14) are assembled in communication to one another in a cavity 13 of socket shell 2 which is opposed to the cavity 6 in which front plug shell insert 16 and rear plug shell insert 17 are assembled.

Front socket shell insert 31 comprises a first portion 33 rotatively mounted in cavity 13 and adapted to rest against inner shoulder 14 of cavity 13, said first portion 33 having an inner thread 34. Front socket shell insert 31 has a second portion 35 having a smaller diameter than first portion 33 and transverse screwdriver slots 36. Second portion 35 of front socket shell insert 31 is adapted to be engaged into the second portion 20 of the front plug shell insert 16 upon assembly of plug shell 1 into socket shell 2.

Rear socket shell insert 32 comprises a first portion 37 in sliding fit in cavity 13 and with an outer thread 38 meshing into the inner thread 34 of the first portion 33 of the front socket shell insert 31. Rear socket shell insert 32 has a second portion 39 forming a square collar 40 resting between external ridges 15 formed around cavity 13 on the rear face 11 of socket shell 2. Preferably, the rear socket shell insert 32 comprises a circular transverse inner latch catching groove 41 and a longitudinal inner groove 42 the purpose of which will be described hereafter.

Thus the assembly of front socket shell insert 31 and rear socket shell insert 32 is obtained by engaging front socket shell insert 31 into cavity 13 as from the front face 10 of socket shell 2 and by engaging rear socket shell insert 32 into cavity 13 as from the rear face 11 of socket shell 2. Meshing of the thread 34 of front socket shell insert 31 onto thread 38 of rear socket shell insert 32 via a screwdriver inserted in slots 36 allows assembly of the two socket shell inserts. Angular position of the assembly is selected and fixed by interpenetration of the square collar 40 of rear socket shell insert 32 into the ridges 15 of socket shell 2. Longitudinal position of the assembly is fixed by the square collar 40 of rear socket shell insert 32 resting against rear face 11 of socket shell 2 and by the first portion 33 of the front socket shell insert 31 resting against inner shoulder 14 of cavity 13.

A tubular sleeve retainer 43 (FIGS. 1 and 8, 9) has a first portion 44 inserted and affixed in the first portion 18 of front plug shell insert 16 and a second portion 45 engaged into the second portion 35 of the front socket shell insert 31. Preferably the first portion 44 of tubular sleeve retainer 43 has a straight knurl 46 and is press fifted into the first portion 18 of front plug shell insert 16. The second portion 45 of sleeve retainer 43 ends in a reduced hole 47.

An alignment sleeve 48 (FIGS. 1 and 10, 11), preferably of ceramic material, is placed in floating condition in the housing 49 formed in sleeve retainer 43, between reduced hole 47 and the bottom of first portion 18 of front plug shell insert 16. Preferably, the alignment sleeve 48 has a longitudinal cut 50 to allow squeezed insertion thereof in sleeve retainer 43 through reduced hole 47.

The fibre optic male contacts 51 have a longitudinally spring biased elongated ferrule 52 (FIGS. 1 and 12) for centrally housing an end portion of a fibre optic core (not shown). The fibre optic male contacts 51 may be of any available design which is not part of this invention and will not be described in further detail.

Each fibre optic male contact 51 is mounted in a plug 53/FIGS. 1 and 12) adapted to be inserted into the rear plug shell insert 17 or rear socket shell insert 32, with the ferrule 52 protruding forwardly of the plug 53. The plug 53 has radially movable resilient latches 54 for insertion into the latch catching grooves 28, respectively 41, of the rear plug shell insert 17 and rear socket shell insert 32. Each latch 54 has an inclined surface 58. A control sleeve 55 is mounted for longitudinal movement on plug 53. Control sleeve 55 has a tubular portion 56 provided with a plurality of windows 57 respectively positioned over the latches 54. Upon rearward movement of control sleeve 55 on plug 53 the front wall 59 of windows 57 urge the inclined surfaces 58 inwardly against resiliency of latches 54 thereby retracting latches 54 radially out of the latch catching grooves 28, respectively 41, of the rear plug shell insert 17 and rear socket shell insert 32 and allowing removal of the plugs out of the inserts. The tubular portion 56 of control sleeve 55 further comprises a radial stud 60 for sliding fit insertion into longitudinal inner grooves 29, respectively 42, of rear plug shell insert 17 and rear socket shell insert 32, whereby the angular position of the plug is fixed with respect to said inserts.

Upon assembly of plug shell 1 and socket shell 2 and insertion of plugs 53 into rear plug shell insert 17 and rear socket shell insert 32, the ferrules 52 of the fibre optic male contacts 51 penetrate into the fully floating alignment sleeve 48 while insertion of latches 54 into latch catching grooves 28 and 41 and insertion of radial studs 60 into longitudinal grooves 29 and 42 assure longitudinal and angular positioning of the plugs 53 in the rear plug shell insert 17 and rear socket shell insert 32. Front to front alignment of the ferrules is thus achieved. Angular position of the ferrules is determined by the stud 60 and longitudinal grooves 29 and 42 in view of the angular position selected for front plug shell insert 16 and rear socket shell insert 32. The latching mechanism of plugs 53 allows easy push-pull self-latching and disconnection of the plugs 53 into and from the inserts 17 and 32.

Variants are available.

For example, the connector system may use a standard two-part connector other than the DIN 41612 connector, the configuration of front and rear plug shell inserts and front and rear socket shell inserts being arranged to match with available configurations of the connector in order to achieve the same results as described.

Though shown with two plugs for front to front alignment of the ferrules of two fibre optic male contacts, the connector system may be used for as many pairs of fibre optic male contacts as the standard connector has opposed cavities.

Although the plug arrangement described is preferred because of its ease and safety of self-latching push-pull operation, other plugs enclosing the fibre optic male contacts may be used, for example plugs with clips for longitudinal positioning of the plug into the inserts or plugs with other latch control means than the windowed control sleeve shown, or still plugs without the stud for angular positioning. It is also possible not to use plugs as described, the body of the fibre optic male contacts being directly inserted and positioned within the inserts.

The collar 40 of rear socket shell insert 32 may be other than square, for example hexagonal.

The front socket shell insert 31 may have no second portion 35 interpenetrating the second portion 20 of front plug shell insert 16, the latter having a correspondingly reduced inner diameter to properly house the tubular sleeve retainer 43. The embodiment shown is however preferred because of the precision of alignment it affords to the inserts of the plug shell and socket shell.

It is also possible not to make use of the tubular sleeve retainer 43 for housing the floating alignment sleeve 48, the latter being housed directly in one of the front plug shell insert 16 and front socket shell insert 31 or in both of them.

Although illustrative embodiments of the invention have been shown and described, a wide range of modification, change and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

1 plug shell
2 socket shell
3 front face of 1
4 rear of 1
6 cavity of 1
7 external shoulder around 6
9 external groove of 6
10 front face of 2
11 rear face of 2
13 cavity of 2
14 inner shoulder of 2
15 external ridges of 13
16 front plug shell insert
17 rear plug shell insert
18 first portion of 16
19 outer thread of 18
20 second portion of 16
21 collar of 20
22 reduced hole of 18
24 first portion of 17
25 inner thread of 24
26 second portion of 17
27 collar of 26
28 latch catching groove in 17
30 traverse slots on 27
31 front socket shell hollow insert
32 rear socket shell hollow insert
33 first portion of 31
34 inner thread of 33
35 second portion of 31
37 first portion of 32
38 outer thread on 37
39 second portion of 32
40 square collar on 39
41 latch catching groove in 32
43 tubular sleeve retainer
44 first portion of 43
45 second portion of 43
47 reduced hole of 45
48 alignment sleeve
49 housing for 48

52 ferrule
53 plug
54 latches on 53
55 control sleeve on 53
56 tubular portion of 55
57 windows openings in 56
58 inclined surface of 54
59 front wall of 57

What is claimed is:

1. A connector system for fibre optic male contacts (51) having an elongated ferule (52) for centrally housing an end portion of a fibre optic core, comprising a standard two-part connector for printed circuit boards having a plug shell (1) inserted into a socket shell (2), said shells having grids (5, 12) and a plurality of opposed cavities (6, 13) for separate contacts, a front plug shell hollow insert (16) and a rear plus shell hollow insert (17) assembled in communication to one another in a cavity (6) of the plug shell (1), and a floating alignment sleeve (48), characterised in that it comprises a front socket shell hollow insert (31) and a rear socket shell hollow insert (32) assembled in communication to one another in a cavity (13) of the socket shell (2) opposed to said cavity (6) of the plug shell (1), in that said front socket shell insert (31) had a first portion (33) engaged into said cavity (13) of the socket shell (2) and a second portion (35) engaged into said front plug shell insert (16) and in that said floating alignment sleeve (48) extends at least in one of said front plug shell insert (16) and front socket shell insert (31) for front to front aligned housing of the ferrules (52) of two fibre optic male contacts (51) respectively plugged into said rear plug shell insert (17) and rear socket shell insert (32).

2. A connector system according to claim 1, wherein said rear plug shell insert (17) is rotatively mounted in said cavity (6) of the plug shell (1) and has a first portion (24) with an inner thread (25) and a second portion (26) forming a collar (27) resting against an external shoulder (7) formed around said cavity (6), and said front plug shell insert (16) has a first portion (18) with an outer thread (19) meshing into the inner thread (25) of the first portion (24) of the rear plug shell insert (17) and a second portion (20) in sliding fit in said cavity (6), said second portion (20) of the front plug shell insert (16) ending in a collar (21) resting in an external groove (9) formed around said cavity (6).

3. A connector system according to claim 2, wherein second portion (20) of said front plug shell insert (16) has longitudinally extending external grooves (23) engaged on longitudinal ridges (8) formed in said cavity (6).

4. A connector system according to claim 2 or 3, wherein said front socket shell insert (31) has said first portion (33) rotatively mounted in said cavity (13) of the socket shell (2) said first portion having an inner thread (34) and resting against an inner shoulder (14) of said cavity (13), and said rear socket shell insert (32) has a first portion (37) in sliding fit in said cavity (13) and with an outer thread (38) meshing into the inner thread (34) of the first portion (33) of the front socket shell insert (31) and a second portion (39) resting against said socket shell (2).

5. A connector system according to claim 4, wherein said second portion (39) of the rear socket shell insert (32) has a polygonal collar (40) resting between external ridges (15) formed around said cavity (13).

6. A connector system according to claim 4, wherein front socket shell insert (31) has a said second portion (35) engaged into said second portion (20) of said front plug shell insert (16).

7. A connector system according to claim 6, further comprising a tubular sleeve retainer (43) having a first portion (44) affixed in said first portion (18) of the front plug shell insert (16) and a second portion (45) engaged into said second portion (35) of the front socket shell insert (31), wherein said alignment sleeve (48) is floating in said tubular sleeve retainer (43).

8. A connector system according to claim 7, wherein said first portion (44) of the tubular sleeve retainer (43) is press-fitted into said first portion (18) of the front plug shell insert (16).

9. A connector system according to any one of claims 1 to 3, wherein said rear plug shell insert (17) and said rear socket shell insert (32) have each a circular transverse inner latch catching groove (28, 41), and wherein each of said fibre optic male contacts (51) is mounted in a plug (53) adapted to be inserted into said rear plug shell insert (17) or rear socket shell insert (32), said plug having radially movable resilient latches (54) for insertion into said latch catching grooves (28, 41).

10. A connector system according to claim 9, further comprising inclined surfaces (58) on said latches (54) and wall means (59) on said plug (53) for urging said latches (54) against resiliency thereof.

11. A connector system according to claim 10, further comprising a control sleeve (55) mounted for longitudinal movement on said plug, wherein said wall means (59) are connected to said control sleeve (55).

12. A connector according to claim 11, further comprising a longitudinal inner groove (29, 42) in each of said rear plug shell insert (17) and rear socket shell insert (32), and a radial stud (60) on said control sleeve (55) for sliding fit insertion into said grooves (29, 42).

13. A connector system according to claim 5, wherein said front socket shell insert (31) has a said second portion (35) engaged into said second portion (20) of said front plug shell insert (16).

* * * * *